United States Patent
Beyder et al.

(10) Patent No.: US 8,055,694 B1
(45) Date of Patent: Nov. 8, 2011

(54) MODULAR INVESTMENT POSITION CALCULATION

(75) Inventors: Vladimir Beyder, East Brunswick, NJ (US); Awanish Choudhury, Alpharetta, GA (US); Mahendra Deshpande, Johns Creek, GA (US); William J. Hines, Jersey City, NJ (US); Chandrasekar Meyyappan, Plainsboro, NJ (US); George M. Pillepich, Ramsey, NJ (US); Joseph J. Rago, Staten Island, NY (US); Deepika Sinha, Princeton, NJ (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 13/115,772

(22) Filed: May 25, 2011

(51) Int. Cl.
*G06F 7/00* (2006.01)

(52) U.S. Cl. ....................................... 708/200

(58) Field of Classification Search .................. 708/200, 708/161–163; 705/1.1, 30, 35–45
See application file for complete search history.

(56) References Cited

U.S. PATENT DOCUMENTS

| | | |
|---|---|---|
| 7,171,416 B2 * | 1/2007 | Kalmick et al. .............. 707/702 |
| 7,610,233 B1 | 10/2009 | Leong et al. |
| 7,627,511 B2 | 12/2009 | Takano et al. |
| 7,657,478 B2 | 2/2010 | De Diego Arozamena et al. |
| 7,716,156 B1 | 5/2010 | Eubank et al. |
| 2006/0059066 A1 | 3/2006 | Glinberg et al. |
| 2007/0043638 A1 | 2/2007 | Tabs et al. |
| 2008/0052137 A1 | 2/2008 | Ziade et al. |
| 2010/0106546 A1 | 4/2010 | Sproule |
| 2010/0185561 A1 | 7/2010 | Torre et al. |

OTHER PUBLICATIONS

Kaarna, Artor et al., "Implementation of an Integrated Activity-Based Costing in a Holistic Database Management System," Lappeenranta University of Technology, Department of Information Technology, Oct. 22, 2006.

* cited by examiner

*Primary Examiner* — Tan V Mai
(74) *Attorney, Agent, or Firm* — Weitzman Law Offices, LLC (57) ABSTRACT

A system and method for effecting modular investment position calculation is disclosed. The system and method comprise a data architecture having multiple stored calculation components. The calculation components include base calculation components and variant calculation components. A calculation spine is assembled by a master control module based upon information received by the master control module indicating that a variant version of a base calculation is to be performed. The calculation spine includes at least some of the base calculation components and at least one of the variant calculation components. The calculation spine is executable by the at least one programmable processor using data received by the processor such that, when the calculation spine is executed, the variant version of the base calculation will be performed using the data.

18 Claims, 5 Drawing Sheets

| Base | Variant A | Variant B | Variant C | ... | Variant n |
|---|---|---|---|---|---|
| S 1 | x | x | S 1c | ... | S 1n |
| S 2 | x | x | S 2c | ... | S 2n |
| S 3 | x | x | S 3c | ... | S 3n |
| S 4 | x | S 4b | S 4c | ... | S 4n |
| S 5 | S 5a | x | S 5c | ... | S 5n |
| S 6 | x | x | S 6c | ... | S 6n |
| S 7 | x | x | x | ... | S 7n |
| S 8 | x | x | S 8c | ... | S 8n |
| S 9 | x | x | S 9c | ... | S 9n |
| S 10 | S 10a | x | S 10c | ... | S 10n |
| S 11 | x | x | S 11c | ... | S 11n |
| S 12 | x | x | x | ... | S 12n |
| S 13 | x | S 13b | S 13c | ... | S 13n |
| ... | ... | ... | ... | ... | ... |
| S n | x | x | S nc | ... | S n |

FIG. 6

MODULAR INVESTMENT POSITION CALCULATION

BACKGROUND

1. Field

This disclosure relates generally to financial calculations and, more particularly, to a system and method for modular investor position calculation.

2. Background

Complex financial investments often require implementation of large processes to facilitate calculation. Current systems may be able to execute calculations, but are generally inflexible, making it difficult to enact even small changes or introduce integration with other external systems. Small changes to one aspect of a calculation may require time intensive re-testing of all other steps to ensure that the change will not cause an error somewhere else in the lengthy calculation process. In addition, these calculations are often broken into smaller independent calculations that are often spread out among a plurality of different systems or processes, oftentimes including human participants. This requires substantial work to be performed in ensuring proper communication between independent sub-systems and sub-processes, adding unneeded complexity. Centralizing these large processes is one viable solution to this problem, but, as mentioned above, the resulting size of the centralized calculation processes makes it inflexible to even small variations.

BRIEF SUMMARY

In one aspect of this disclosure, a computer apparatus is disclosed, comprising at least one programmable processor, and data storage accessible by the processor, wherein the at least one programmable processor is connected to the data storage to receive information from the data storage. The data storage comprises a data architecture having multiple calculation components stored in the data storage, the calculation components including base calculation components and variant calculation components, and a calculation spine, the calculation spine having been assembled by a master control module based upon information received by the master control module indicating that a variant version of a base calculation is to be performed. The calculation spine includes at least some of the base calculation components and at least one of the variant calculation components. The calculation spine is assembled by the master control module, and is executable by the at least one programmable processor using data received by the processor such that, when the calculation spine is executed, the variant version of the base calculation will be performed using the data.

In another aspect of this disclosure, a computer implemented method is disclosed, comprising receiving, using a processor, an identifier indication that a complex calculation is to be performed on data, and determining, based upon the identifier, whether the complex calculation is a base complex calculation or a variant complex calculation. At least one processor is used to access data storage including therein, multiple calculation components. At least some of the calculation components are retrieved from the data storage when the complex calculation is a variant complex calculation, including base calculation components for all portions of the complex calculation that do not require variant processing steps and variant calculation components for those portions of the complex calculation that require variant processing steps. The retrieved base calculation components and variant calculation components are assembled into a calculation spine. Data is retrieved using the processor. The calculation spine is executed with the processor using the data to perform the complex calculation on the data and generate a result for the complex calculation.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

The disclosed modular investor position calculation system and method operates by breaking large, complex financial calculation processes into a set of self-contained computation components. As a result, large complex financial calculations may be dynamically assembled through combination of individual computation components. Selected computation components may be arranged in a pre-determined order to produce a complete "spine" of the complex financial calculation. The calculation "spine" may then be executed to output the desired information. Individual computation components are preferably editable without regard to other computation components. Therefore, changes to the complex financial calculations may be executed by editing only the relevant computation components, enabling easy creation of different customized variants of the complex financial calculation with minimal changes overall.

Figure 1:
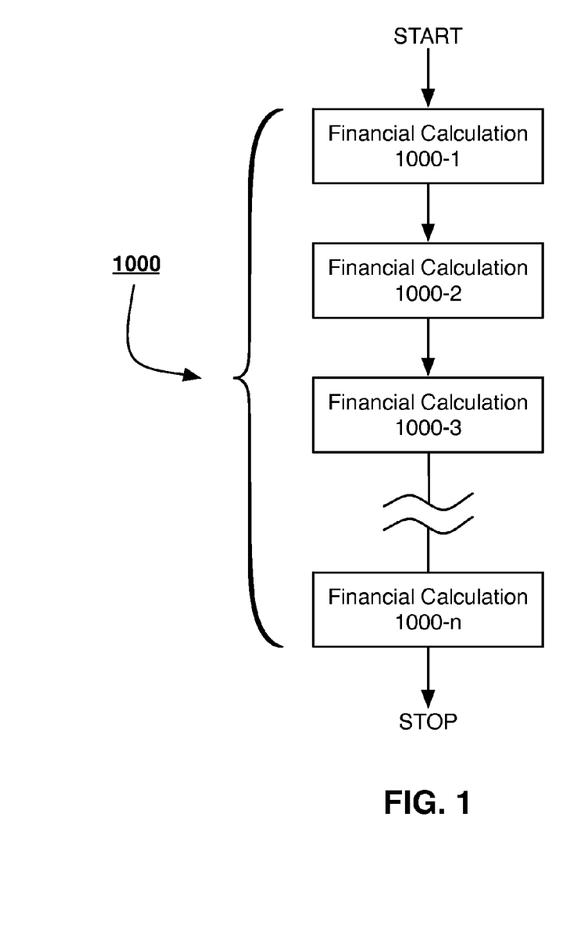
FIG. 1 is a high level representation of a series of complex financial calculations being performed for a party.

FIG. 1 is a high level representation of a series of complex financial calculations 1000 to be performed. The series of complex financial calculations 1000 may include financial calculations 1000-1, 1000-2, 1000-3 . . . 1000-n, which may be, for example, one or more of: a drawdown distribution calculation, an administrative allocation distribution calculation, a management/trailer fees calculation, a net asset value calculation, or some other standard or custom financial calculation.

Figure 2:
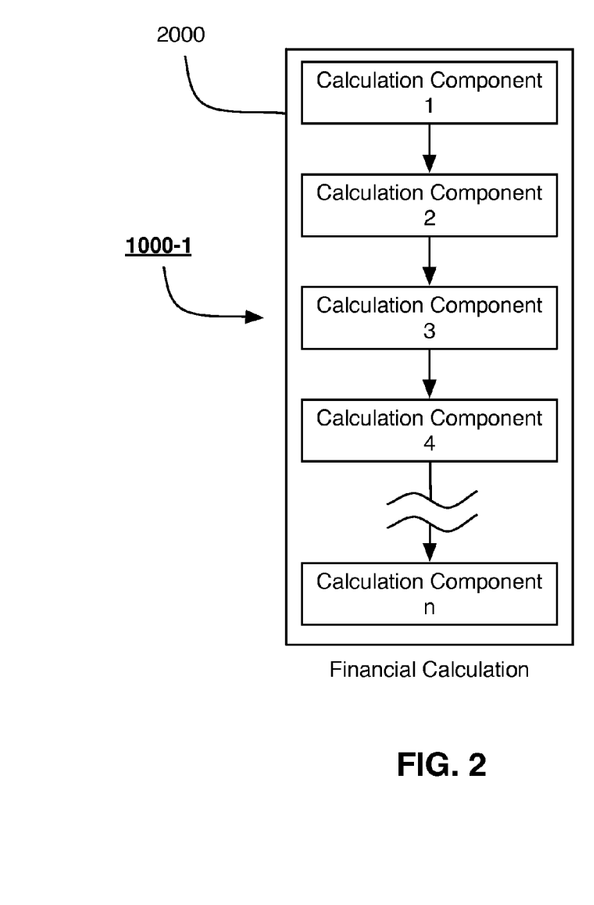
FIG. 2 is a high level representation of the calculation components that form a calculation spine of a complex financial calculation.

FIG. 2 is a high level representation of calculation components that have been assembled to form a calculation spine 2000 that makes up one complex financial calculation 1000-1. As can be seen, complex financial calculation 1000-1 is broken into a number of individual calculation components 1, 2, 3, 4 . . . n. Each calculation component 1, 2, 3, 4 . . . n is preferably a self-contained editable process. The complex financial calculation 1000-1 is assembled by retrieving selected calculation components from among a group of components and assembling them in the appropriate order, as described in greater detail below, thereby creating the calculation "spine" 2000 of the complex financial calculation 1000-1. The financial calculation 1000-1 is performed by executing the calculation spine 2000. This same approach can be used for each of the other financial calculations 1000-2, 1000-3 . . . 1000-n.

Figure 3:
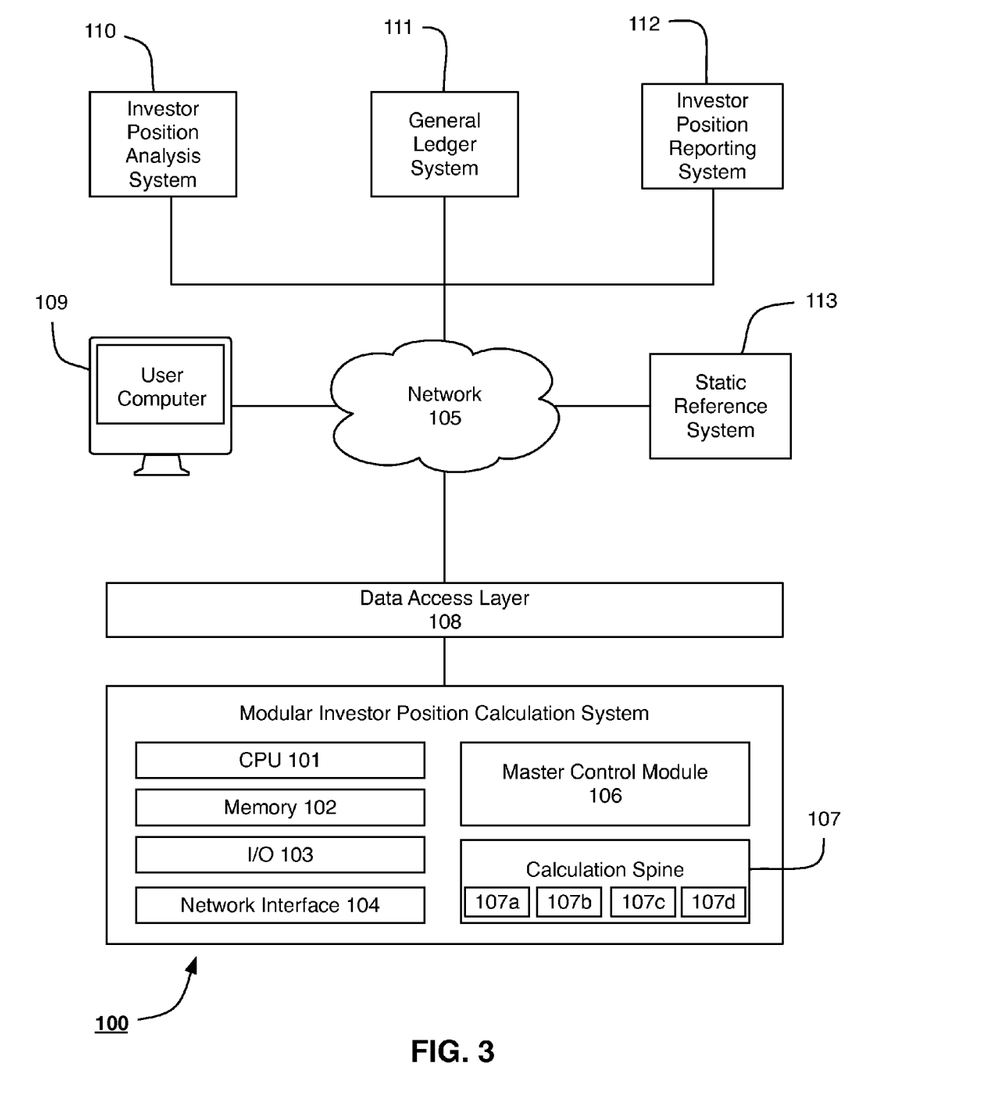
FIG. 3 is a high level representation of a modular investor position calculation system.

FIG. 3 is a high-level representation of an illustrative modular investor position calculation system 100. The investor position calculation system 100 may be implemented using one or more computing systems and software processes. Each computing system preferably includes computing components for receiving inputs and executing computer program instructions. These components may include a central processing unit (CPU) 101, memory 102, input/output (I/O) devices 103 and a network interface 104.

The CPU 101 processes and executes computer program instructions. Random access memory (RAM) 102 and/or fast access cache memory preferably provides fast data supply to CPU 101. Long-term storage may be provided as a more permanent form of computer memory, and may be, for example, a hard disk, optical disk, flash memory, solid-state memory, tape, or any other type of memory. The I/O device(s) 103 permit human interaction with the computer system, such as (but not limited to) a mouse, keyboard and computer display. I/O device(s) 103 may also include other interactive devices, such as (but not limited to) touch screens, digital stylus, voice input/output, etc. The network interface device 104 may provide the computing system with access to a network 105, which may be a wireless or wired connection. The network 105 may be, for example, the Internet, a corporate intranet, or any other computer network through which the computing system may connect to or otherwise communicate with other computers and any other systems representing computerized systems or databases for specialized information that may be necessary for implementation of the modular investor position calculation system 100.

The modular investor position calculation system 100 may include a master control module 106 and a calculation spine such as described in connection with FIG. 2 and FIG. 6. Calculation spine 107 and calculation components 107a-107d represents a fully assembly calculation spine, and may be implemented in a substantially similar fashion as the calculation spine 2000 and calculation components 1, 2, 3, 4 . . . n of FIG. 2. It is understood that calculation spine 107 and 2000, and calculation components 1, 2, 3, 4 . . . n and 107a-107d are generic and any configuration or number of calculation components may be utilized to generate a desired calculation spine for any complex calculation. The master control module 106 may include one or more computer systems and/or software processes that are responsible for preparing and executing complex financial calculations. The master control module 106 is typically tasked with retrieving the necessary calculation components 107a-107d, assembling the calculation components 107a-107d, handling special exception requests, retrieving other information necessary to carry out the calculation, and facilitating storage of the results of the calculation. When assembled, the calculation spine 107 will be a fully assembled complex financial calculation ready to be executed.

Data access layer 108 may represent a computer system or software process responsible for translating data into a format intelligible by the modular investor position calculation system 100. The interposition of a data access layer 108 is advantageous because it may allow any external system to be operatively coupled with the investor position calculation system 100 without requiring any alteration of the master control module 106, calculation spine 107 or, more importantly, the calculation components 107a-107d that are assembled to form calculation spine 107. Instead, all conversion steps may be performed within the data access layer 108, thereby eliminating any need to alter the external systems or the modular investor position calculation system 100 to conform to any external protocol.

User computer 109 may represent computer systems used by operators of the modular investor position calculation system 100 to initiate complex financial calculations. A graphical user interface may be displayed on user computer 109 to ease interaction. The user computer 108 may be operatively coupled to the investor position calculation system 100 remotely through network 105. In one embodiment, the user computer 109 may access the investor position calculation system 100 through a high-level investment position analysis system 110. The investment position analysis system 110 may represent some combination of computer systems and/or software processes tasked with performing high-level calculations for a financial investment, thereby forming a foundation of data allowing more specific calculations to be performed, such as calculations related to the investments for one specific investor.

Other systems may supplement the modular investor position calculation system 100 and method. Investment position analysis system 110, general ledger system 111 and investor position reporting system 112 may represent other computer systems or software processes operating in support of or in conjunction with the modular investor position calculation system 100. As described above, the modular investment position analysis system 110 may be utilized to perform high-level calculations on investment funds. The general ledger system 111 may represent a database tasked with recording basic back-end information corresponding to the generic books and records for any typical investment and investor, which may include results from previous calculations. The investor position reporting system 112 may be utilized to generate finalized reports from calculations and information contained within the other systems. The static reference system 113 may serve as a database for relatively static data about investments or investors, such as management fee percentage, preferred return hurdle, etc.

Figure 4:
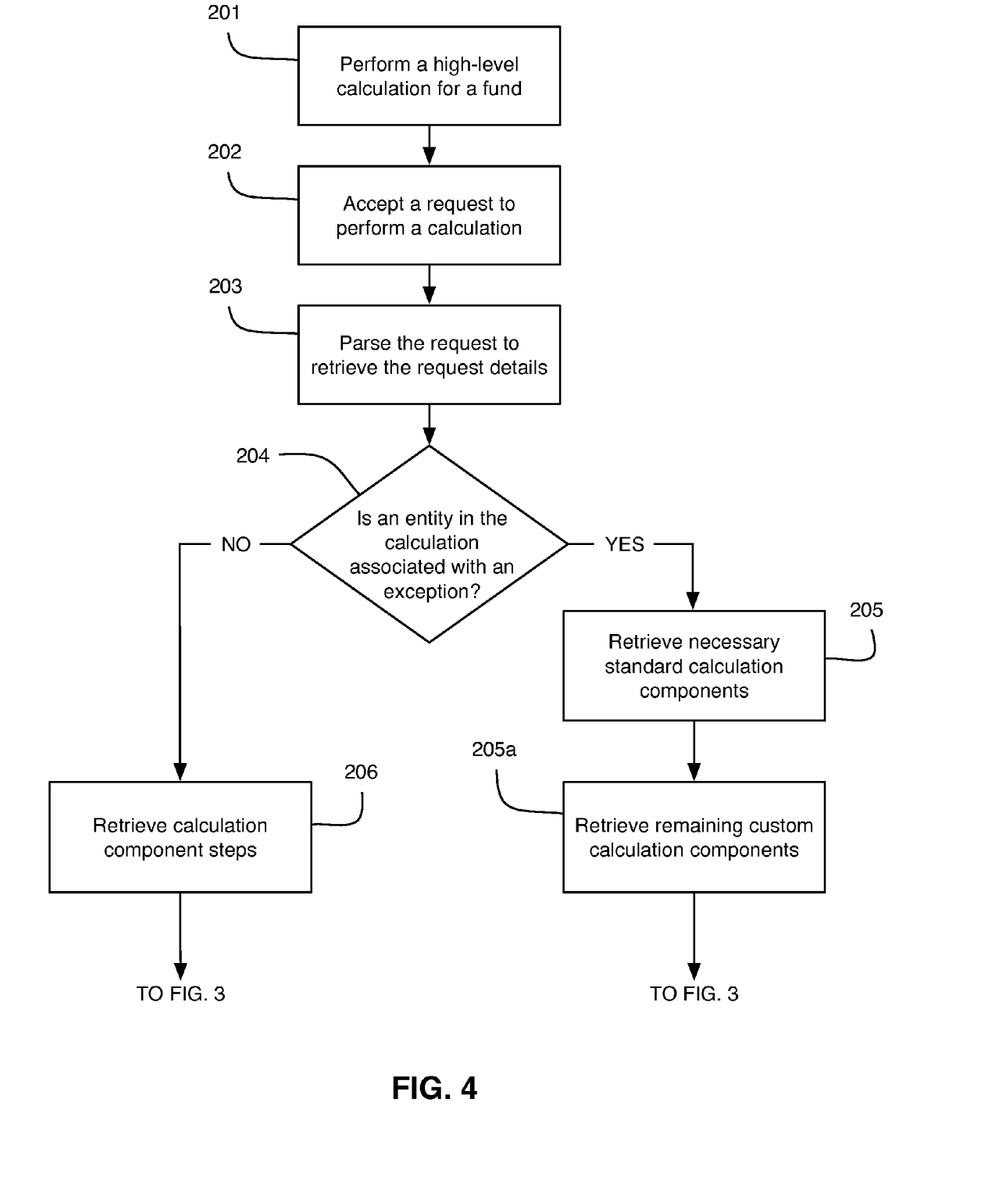
FIG. 4 is a flow chart representing a preferred sequence of steps for implementing a modular investor position calculation system and method.
Figure 5:
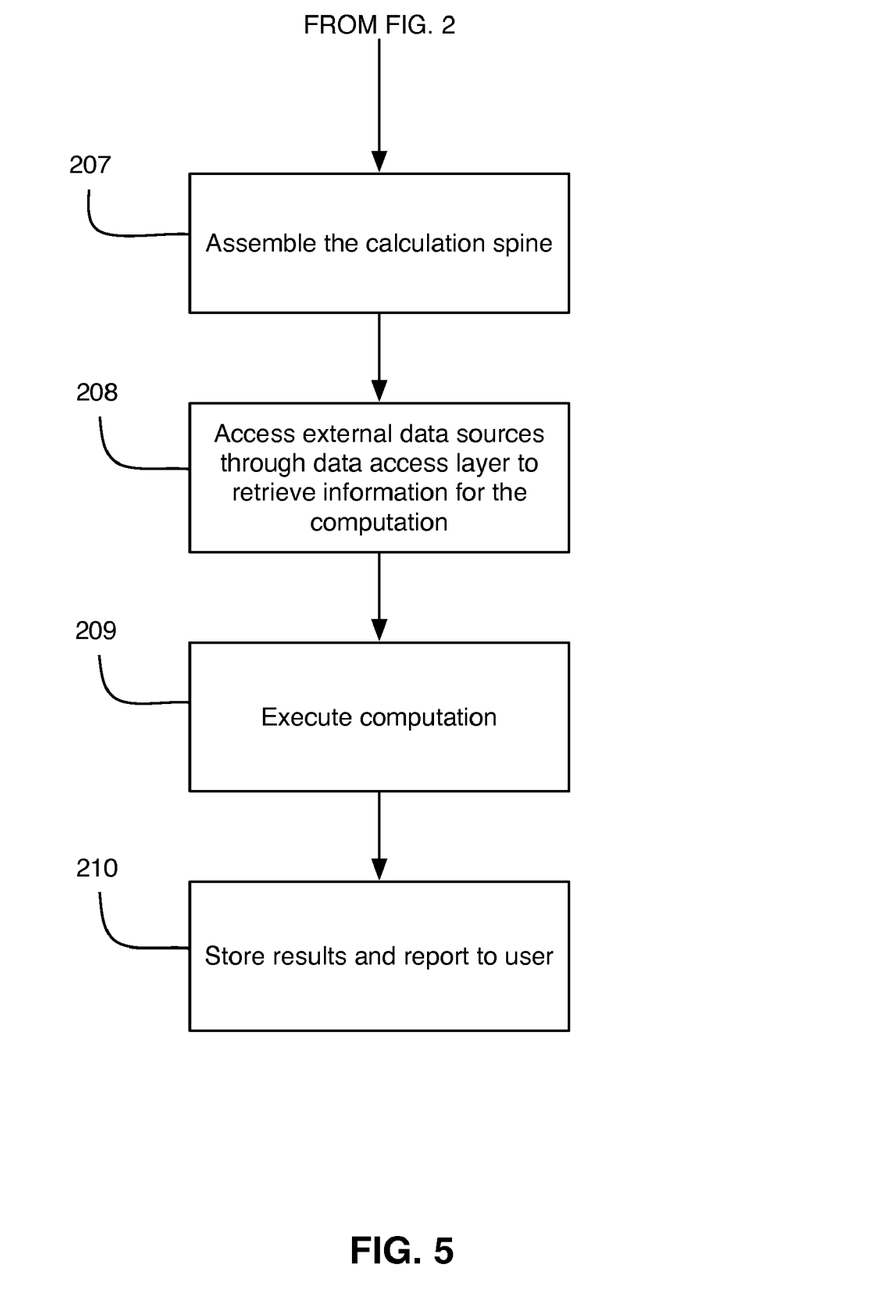
FIG. 5 is a flow chart representing a continued sequence of steps for implementing a modular investor position calculation system and method.

FIGS. 4 and 5 are flow charts representing a preferred sequence of steps for implementing a modular investor position calculation system 100 and method. Referring to FIG. 4, a high-level calculation may be performed for a fund in step 201. The high-level calculation may be initiated by a user operating user computer 109, and executed on the investment position analysis system 110. This execution of the high-level financial calculation may form a foundation of information necessary to perform more specific calculations.

In step 202, the modular investor position calculation system 100 may receive a request to perform a complex financial calculation. A user on user computer 109 may instruct the modular investor position calculation system 100 to perform a calculation by sending a request over network 105 to the modular investor position calculation system 100. The request is preferably received through network interface 104.

In step 203, the request is preferably parsed to retrieve the request details. Master control module 106 preferably analyzes the packet and accesses the appropriate information to set up the complex financial calculation based on the information contained within the packet. The packet may include a variety of data identifying, for example, the request type, an identifier for the request, work flow type, version identifier, fund identifier, investment identifier, legal entity identifier, investor identifier, effective date and the front-end user, etc. Some or all of this information may be utilized by the modular investor position calculation system 100 to determine, for example, what kind of financial calculation is to be performed, how it is to be performed, the investor or entities involved in the calculation, etc. The type of calculation to be performed may, in turn, indicate to master control module 106 which calculation components 107a-107d are required to assemble the calculation spine, and the order in which they are to be combined.

In step 204, the master control module 106 may determine whether one or more of the related entities identified in the packet are associated with a "side letter" exception calculation component. A side letter exception calculation component may represent special processes or calculations that are to be utilized when assembling the calculation spine 107. This may be useful when implementing special customized calculations for interested parties. The utilization of side letter exceptions may allow the creation of custom calculation spines 107 without requiring substantial alteration of most calculation components 107a-107d. This process may, for example, be used to accommodate investors who prefer to have their data prepared in a non-standard way. Instead of altering the entire calculation spine 107, standard calculation components may still be complemented by or substituted with alternate side letter exception specific calculation components. Therefore, accommodating the investor-specific calculation would require only the creation of alternate side letter exception calculation components, and the inclusion of instructions to master control module 106 to utilize the side letter exception specific calculation components.

The master control module 106 may determine whether an entity requires use of one or more side letter exceptions by consulting, for example, a table storing associations between entities and side letter exception calculation components. Entity information may be retrieved from the data packet (described above) and compared to information in the table to determine if there is a match in the table for the entity. If one or more entities identified in the packet are determined to be associated with a side letter exception calculation component, then, in step 205, the relevant side letter exceptions calculation components may be retrieved. Subsequently, in step 205a, the master control module 106 may retrieve the custom set of calculation components for the desired complex financial calculation. If no entities are associated with side letter exceptions, then the method may progress immediately to step 206, where the master control module 106 may retrieve the standard calculation components necessary to assemble the financial calculation. In either event, the method may then progress to the preferred sequence of steps illustrated in FIG. 5.

Referring to FIG. 5, the master control module 106 may assemble the calculation spine 107 from the retrieved calculation components 107a-107d in step 207. As described above, information contained in or associated with the data packet will indicate to the master control module 106 what type of financial calculation is to be performed.

For example, the data packet may indicate a financial calculation, such as, for example, a "drawdown distribution," an "administrative allocation," a "management/trailer fees calculation," a "net income allocation/deemed distribution," etc. Once the master control module 106 has determined what kind of financial calculation is to be performed, the relevant calculation components 107a-107d (per steps 205 and 206 above) are retrieved. Then, according to a stored schema for the known financial calculation, master control module 106 may assemble the relevant calculation components 107a-107d to form the calculation spine 107.

In step 208, once the calculation spine 107 has been assembled, the master control module 106 may retrieve the necessary data inputs to execute the calculation spine 107. This information may be retrieved from other external database systems, such as the general ledger system 111, static reference system 113 and/or any other database systems that may be coupled to the modular investor position calculation system 100. As described above, use of external systems having disparate protocols for data inputs may be coupled to the modular investor position calculation system 100 through Data Access Layer 108, which may be adapted to translate data inputs from external systems for use with the modular investor position calculation system 100. In step 209, the master control module 106 may execute the complex financial calculation, and, in step 210, the results may be stored and reported to the user on user computer 109.

Figure 6:
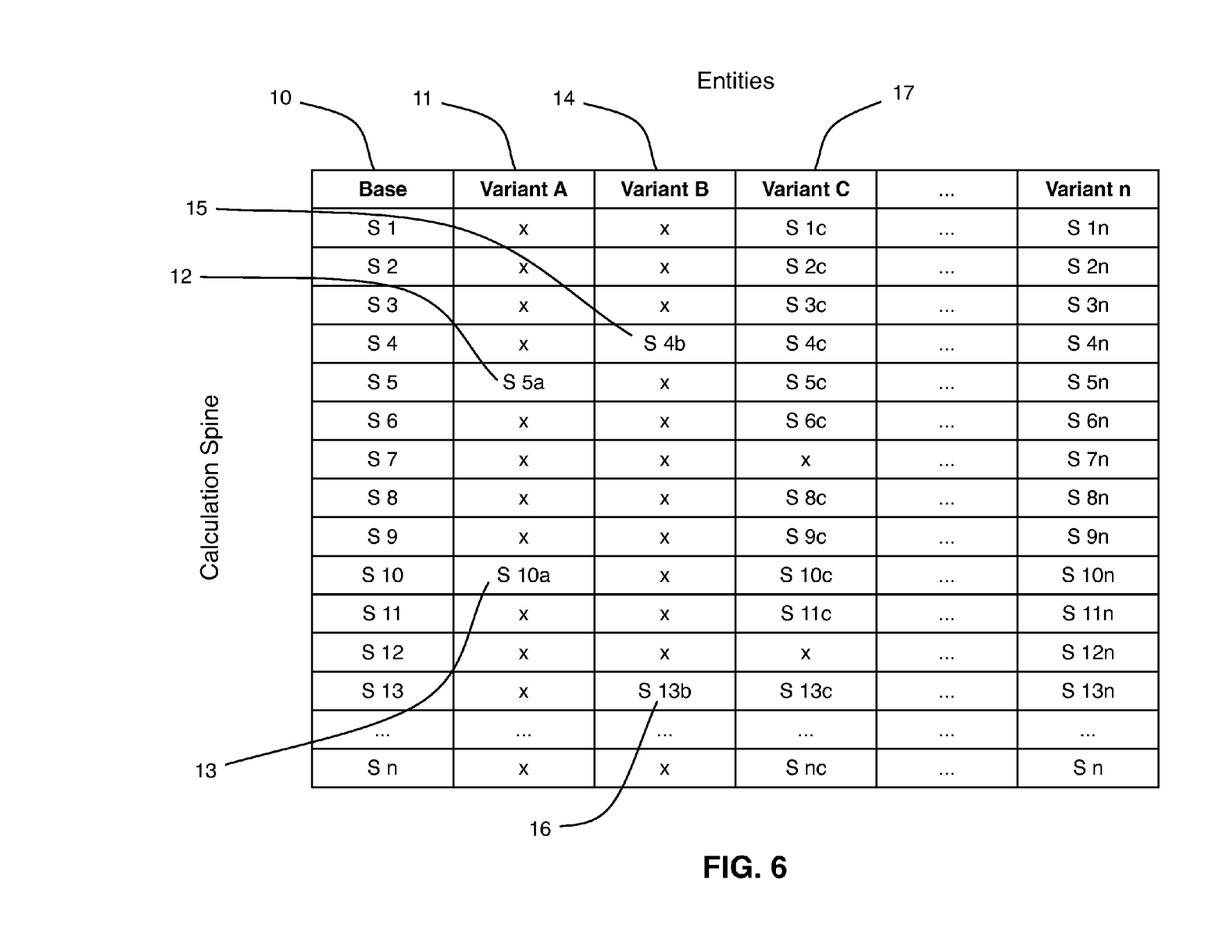
FIG. 6 is a table illustrating different possible configurations of a calculation spine as assembled for different client requirements.

The advantages of this approach are evident in FIG. 6, which is an example table illustrating how different variant calculations can be created using the approach described herein. As shown, the first column (10) contains the calculation components that form a "base" version of the complex financial calculation. The base version is logically subdivided into individual computation components denoted "S 1" through "S n." With this example, assembly of components "S 1" through "S n" would create the calculation spine for execution of the "base" complex financial calculation.

However, if a slightly different variant of the base calculation (called variant "A" herein) is desired in some instances that would involve, for example, modifying components "S 5" and "S 10," this can be easily accomplished. The second column (11) illustrates for example, a variant "A" may be created from the "base" complex financial calculation. As indicated in the second column (11), variant "A" uses the same computation components "S 1" through "S 4," "S 6" through "S 9," and "S 11" through "S n." However, customized computation components "S 5a" (12) and "S 10a" (13) have been created. These customized variants may be built off their original "base" counterparts, "S 5" and "S 10," or created anew. However, since they are the only affected components, the remaining "base" components need not be reviewed or tested, saving significant time and effort, because editing and error testing will only need to be conducted for components "S 5a" (12) and "S 10a" (13).

Another example variant "B," as illustrated in the third column (14) may be produced in a similar manner from the "base" complex financial calculation. Variant "B" also uses mostly "base" computation components, except for computation component "S 4b" (15) and "S 13b" (16), thereby creating an entirely different variant from the base of variant "A" with minimal effort.

The fourth column (17) illustrates a third example variant "C." Variant "C" is also created from the "base" variant, but has significant changes through most of its respective computational components in its calculation "spine." Variant "C" therefore represents a more serious modification to the "base" variant than variants "A" and "B." As can now be appreciated, any of numerous further variations and combinations are possible.

In operation, if the master control module receives an indicator that a calculation corresponding to the "base" variant is to be performed, components "S 1" through "S n" would be used to assemble the calculation spine for execution. However, if a calculation according to variant "B" was called for, the master control module would retrieve steps "S 1" through "S 3," "S 5" through "S 12," and "S 14" through "S n" of the 'base calculation and "S 4b" and "S 13b" from variant "B." Thus, component "S 4b" would be substituted for component "S 4" and component "S 13b" would be substituted for component "S 13" in assembling the calculation spine to be executed. Note, that although the example is illustrated in tabular form for simplicity, a table is not required. Any method of identifying components and variant components that would allow the master control module to retrieve the right calculation components for assembly into the calculation spine will work.

In sum, the disclosed modular investor position calculation system and method is more flexible and adaptable than current solutions, allowing for easier alteration of existing financial calculation programs. Error checking may be performed by ensuring that the results obtained in each modified module sub-process are correct, rather than rechecking the entire financial calculation. Additionally, customized complex calculations may be developed for specific users or situations with ease by insertion of optional modules during calculation assembly, rather than requiring a redevelopment of the entire calculation.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computer apparatus comprising:
   at least one programmable processor;
   data storage accessible by the processor, wherein the at least one programmable processor is connected to the data storage to receive information from the data storage, wherein the data storage comprises a data architecture having
   i) multiple calculation components stored in the data storage, the calculation components including base calculation components and variant calculation components, the base calculation components being assemble-able together to perform a base calculation and the variant calculation components being substitutable in place of one or more of the base calculation components and assemble-able with some of the base calculation components to perform a variant version of the base calculation,
   ii) a calculation spine assembled from the calculation components, the calculation spine having been assembled by a master control module based upon information received by the master control module indicating that the variant version of the base calculation is to be performed, the calculation spine including only some of the base calculation components and at least one of the variant calculation components;
   the calculation spine, assembled by the master control module, being executable by the at least one programmable processor using data received by the processor such that, when the calculation spine is executed, the variant version of the base calculation will be performed using the data.

2. The computer apparatus of claim 1, wherein the variant calculation components are based on the base calculation components.

3. The computer apparatus of claim 1, wherein the variant calculation components are created independently from all of the base calculation components.

4. The computer apparatus of claim 1, further comprising a second calculation spine, the second calculation spine having been assembled based upon information received by the master control module indicating that a second variant version of the base calculation is to be performed, the second calculation spine including only variant calculation components, at least one of which was derived from an individual base calculation component.

5. The computer apparatus of claim 1, wherein the variant version is used when an entity associated with the complex calculation requires specialized treatment for a particular complex calculation.

6. The computer apparatus of claim 1, further comprising external databases, wherein a data access layer is interposed between external databases and the data architecture, the data access layer translating outside protocols used by the external databases to a format intelligible by the data architecture.

7. The computer apparatus of claim 1, wherein the complex calculation is a drawdown distribution calculation.

8. The computer apparatus of claim 1, wherein the complex calculation is an administrative allocation distribution calculation.

9. The computer apparatus of claim 1, wherein the complex calculation is a management/trailer fees calculation.

10. A computer implemented method comprising:
    receiving, using a processor, an identifier indication that a complex calculation is to be performed on data;
    determining, based upon the identifier, whether the complex calculation is a base complex calculation or a variant complex calculation;
    accessing, using at least one processor, data storage including therein, multiple calculation components;
    retrieving from the data storage, when the complex calculation is to be a base calculation, base calculation components necessary to perform a base version of the complex calculation, and when the complex calculation is to be a variant version of the base complex calculation, (i) some base calculation components for all portions of the complex calculation that do not require variant processing steps and, (ii) at least one variant calculation component to be used in place of specific base calculation components of the complex calculation for those portions of the complex calculation that require variant processing steps when the complex calculation is to be a variant calculation;
    assembling the retrieved base calculation components and the at least one variant calculation component into a calculation spine;
    receiving data using the processor; and
    executing the calculation spine with the processor using the data to perform the complex calculation on the data and generate a result for the complex calculation.

11. The method of claim 10, wherein the variant calculation components are based on the base calculation components.

12. The method of claim 10, wherein the variant calculation components are created independently from all of the base calculation components.

13. The method of claim 10, further comprising assembling a second calculation spine, the second calculation spine including only the variant calculation components, at least one of which was derived from an individual base calculation component.

14. The method of claim 10, wherein the variant complex calculation is used when an entity associated with the complex calculation requires specialized treatment for a particular complex calculation.

15. The method of claim 10, further comprising translating the received data with the processor into an intelligible protocol.

16. The method of claim 10, wherein the complex calculation is a drawdown distribution calculation.

17. The method of claim 10, wherein the complex calculation is an administrative allocation distribution calculation.

18. The method of claim 10, wherein the complex calculation is a management/trailer fees calculation.

\* \* \* \* \*